July 20, 1943.   H. T. HALLOWELL, JR   2,324,925
ASSEMBLING MACHINE
Filed Dec. 22, 1941   6 Sheets-Sheet 3

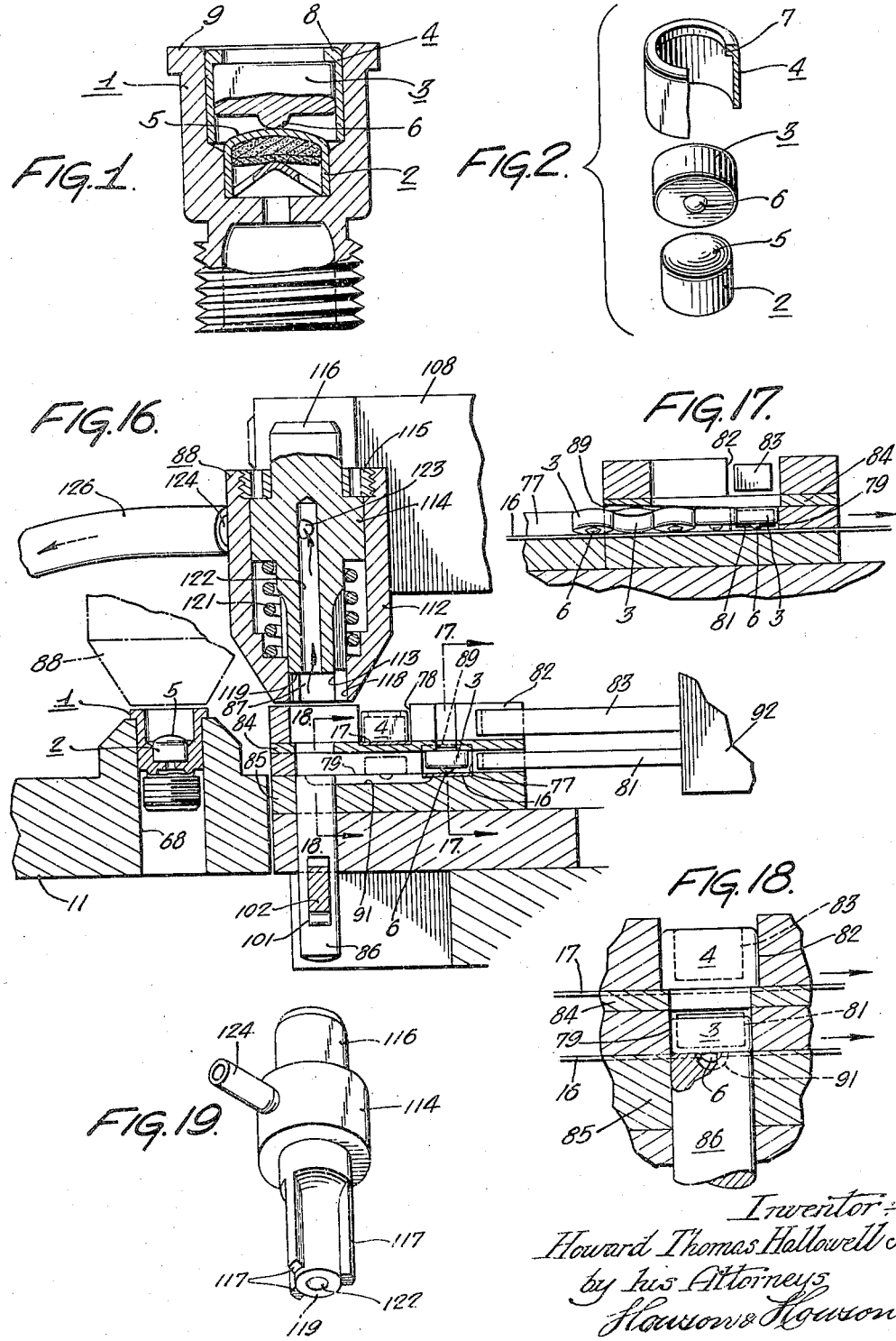

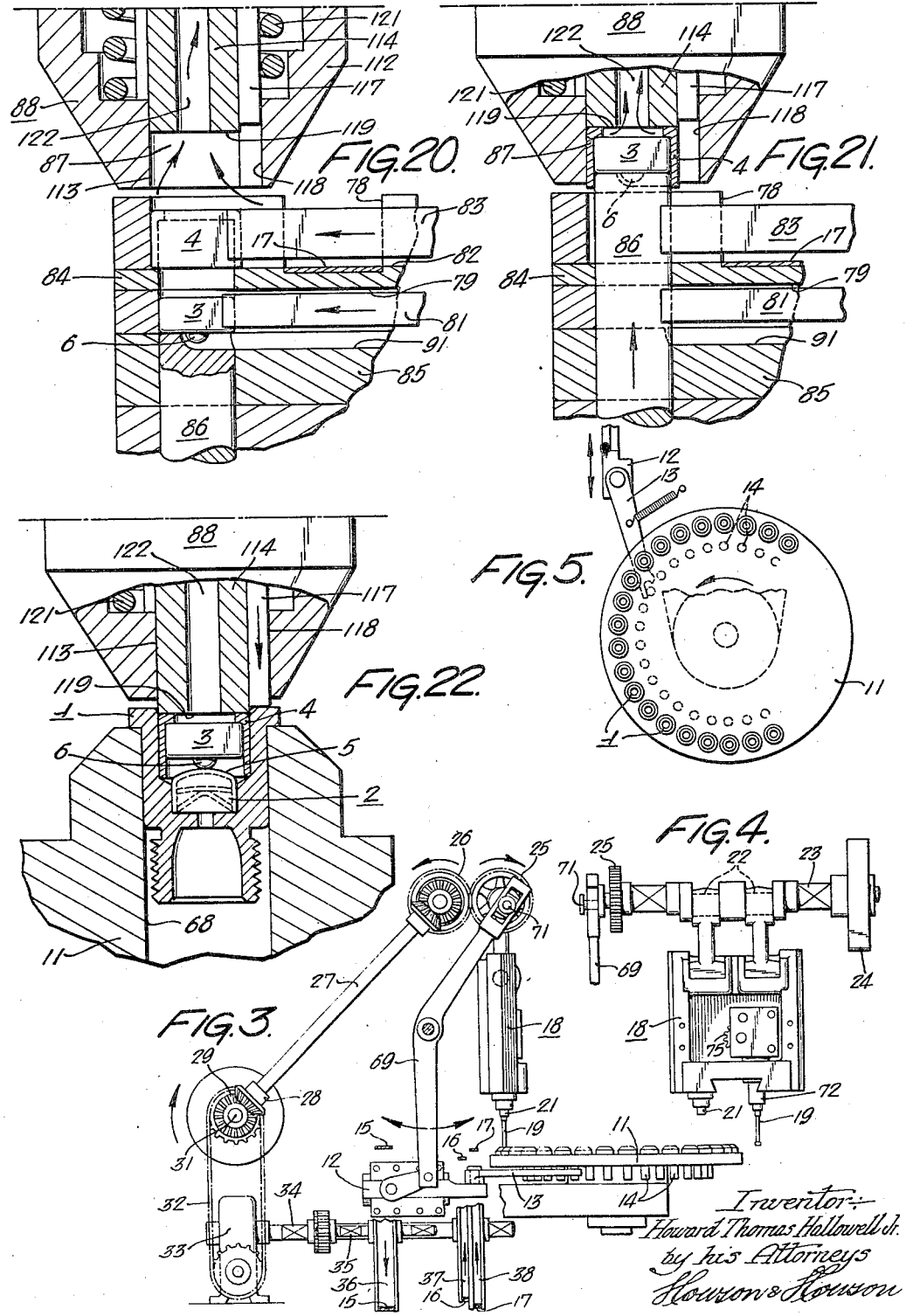

Inventor:
Howard Thomas Hallowell Jr.
by his Attorneys
Howson & Howson

July 20, 1943.  H. T. HALLOWELL, JR  2,324,925
ASSEMBLING MACHINE
Filed Dec. 22, 1941   6 Sheets-Sheet 4
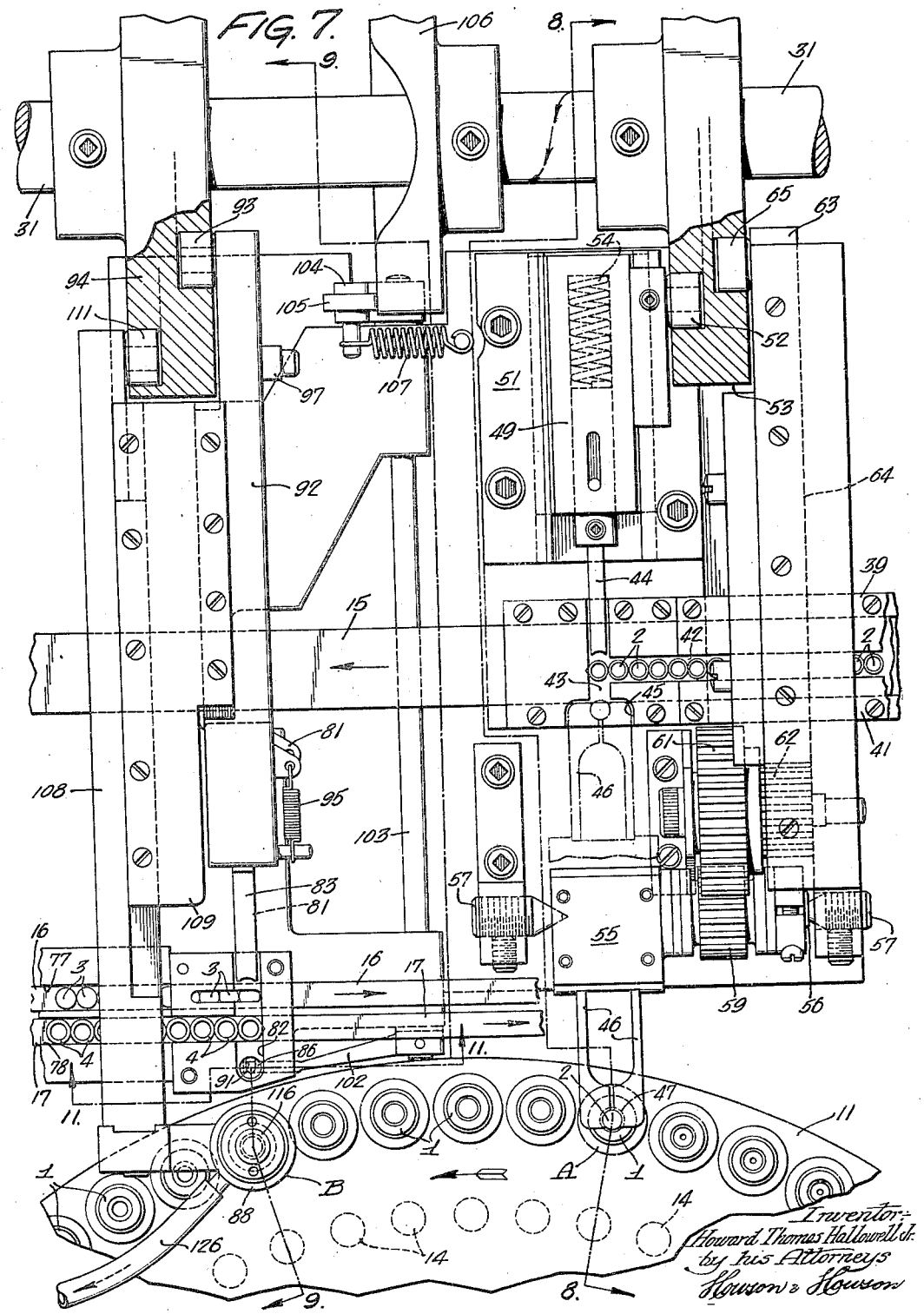

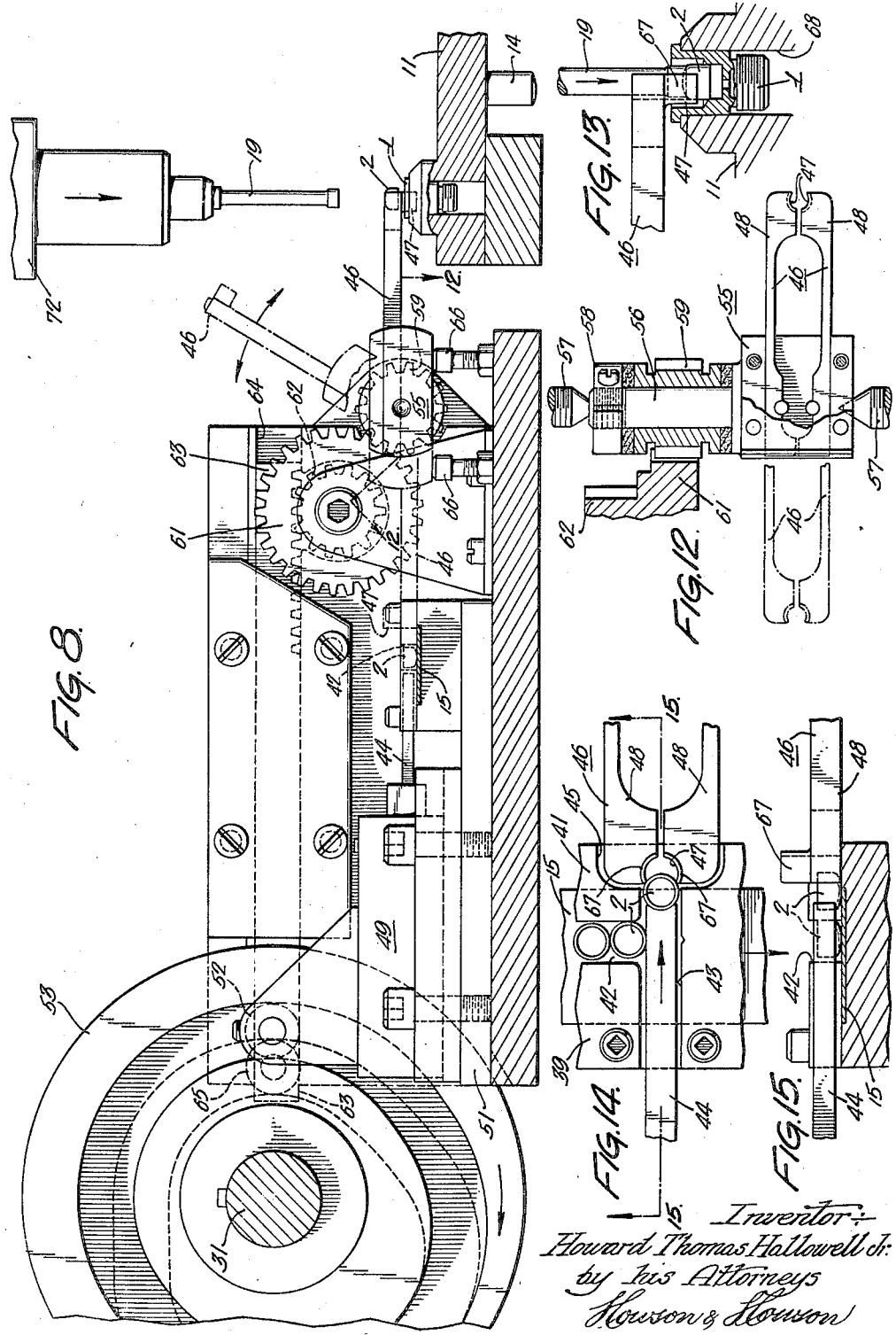

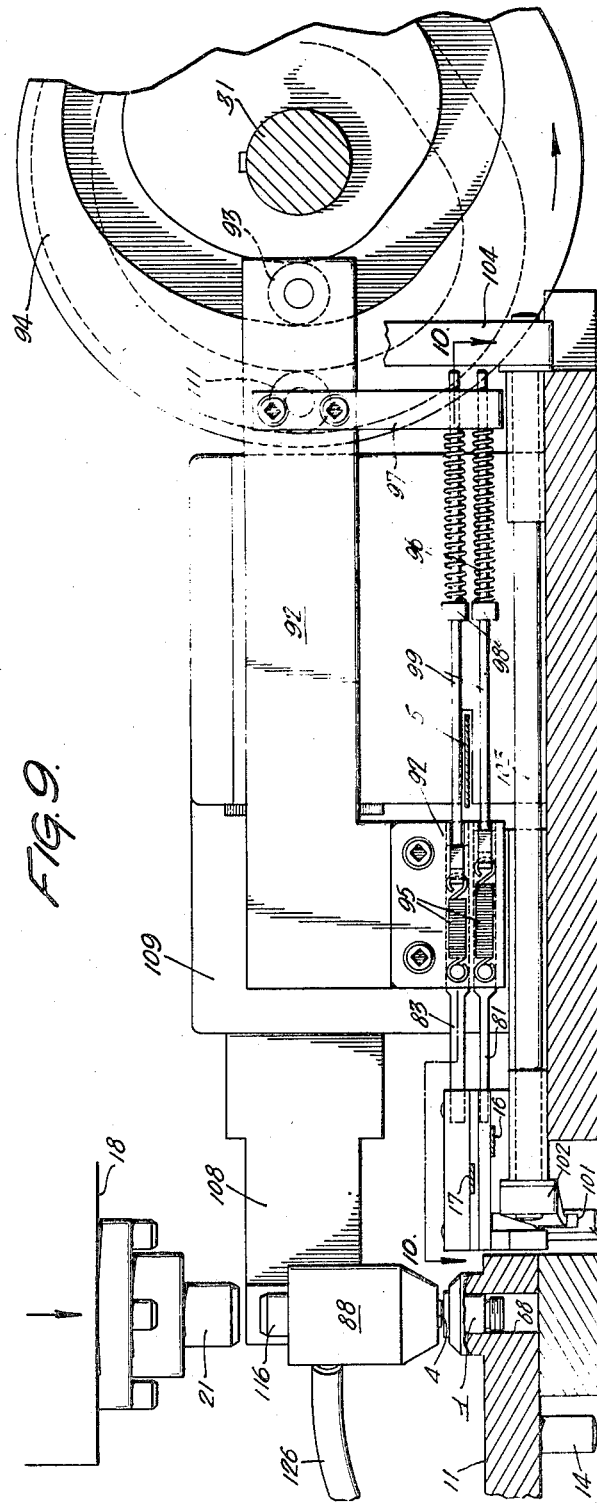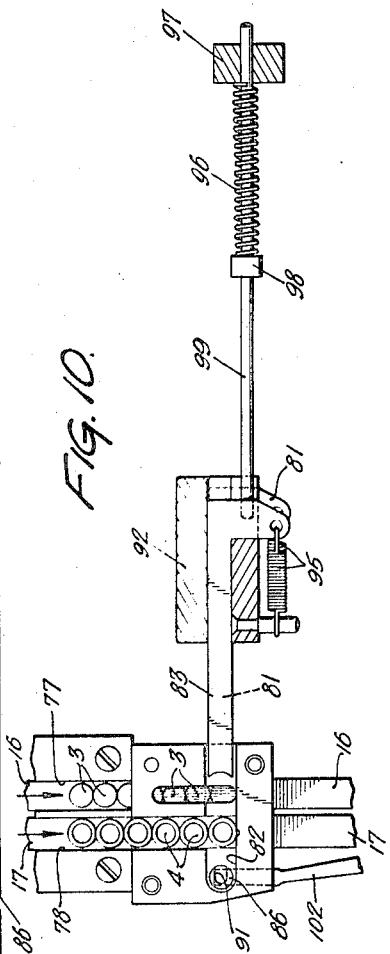

Patented July 20, 1943

2,324,925

UNITED STATES PATENT OFFICE 2,324,925

ASSEMBLING MACHINE

Howard Thomas Hallowell, Jr., Jenkintown, Pa., assignor to Pennsylvania Manufacturing Company, Jenkintown, Pa., a corporation of Delaware Application December 22, 1941, Serial No. 424,052

13 Claims. (Cl. 86—1)

A principal object of this invention is to provide a machine for assembling the several elements which constitute the priming head for explosive shells.

In the attached drawings:

Figure 1 is a longitudinal sectional view of one of the assembled priming heads;

Fig. 2 is an exploded view in perspective showing the individual internal elements of the priming head;

Fig. 3 is a diagrammatic side elevational view of the machine showing the major essential parts of the assembling mechanism;

Fig. 4 is a front elevational view of a portion of the mechanism shown in Fig. 3;

Fig. 5 is a fragmentary view illustrating in plan one of the elements of the mechanism shown in Fig. 3;

Fig. 7 is a plan view of the machine as viewed from the line 7—7, Fig. 6;

Fig. 8 is a sectional view on the line 8—8, Fig. 7;

Fig. 9 is a sectional view on the line 9—9, Fig. 7;

Fig. 10 is a sectional view on the line 10—10, Fig. 9;

Fig. 12 is a sectional view on the line 12—12, Fig. 8;

Fig. 13 is a fragmentary enlarged sectional view of that portion of the mechanism shown at the extreme right in Fig. 8, the parts being shown in different relative positions to illustrate the mode of operation;

Fig. 14 is a fragmentary plan view illustrating a detail of the mechanism;

Fig. 15 is a sectional view on the line 15—15, Fig. 14;

Fig. 16 is a fragmentary sectional view illustrating a further detail of the mechanism;

Fig. 17 is a sectional view on the line 17—17, Fig. 16;

Fig. 18 is a sectional view on the line 18—18, Fig. 16;

Fig. 19 is a view in perspective of one of the elements of the mechanism illustrated in Fig. 16, and Figs. 20, 21 and 22 are fragmentary sectional views showing successive steps in the assembling operation as a whole.

Figure 6:
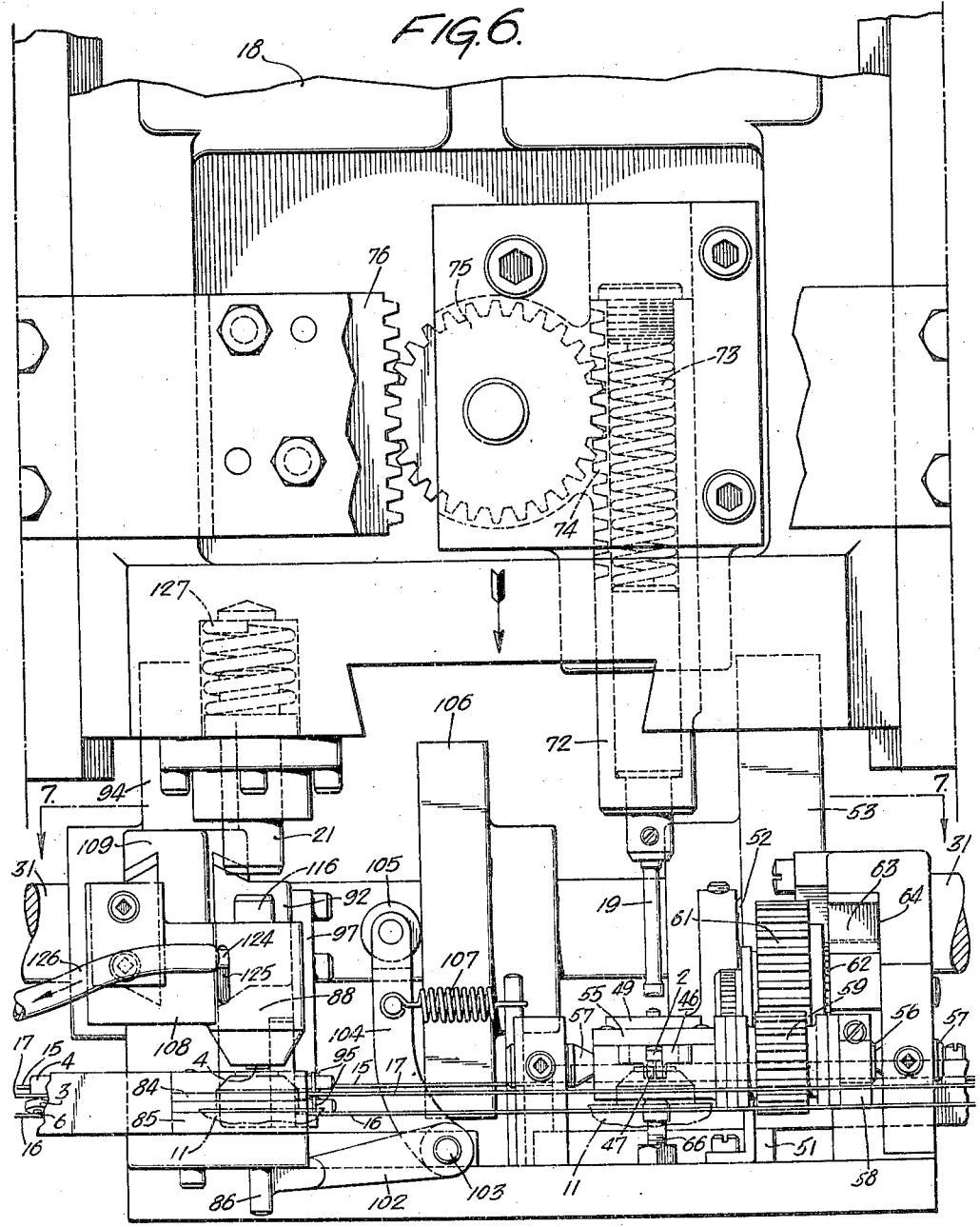
Fig. 6 is a fragmentary front elevational view of the machine.
Figure 11:
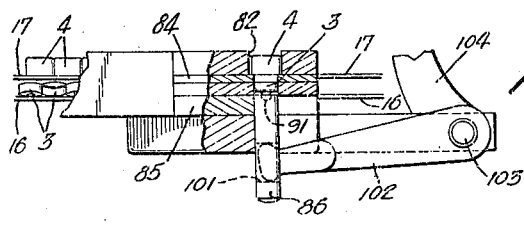
Fig. 11 is a sectional view on the line 11—11, Fig. 7.

In Figs. 1 and 2 of the drawings, I have illustrated a priming head and the several parts thereof which the machine forming the subject of the present invention is primarily adapted to assemble. The head comprises an outer casing 1 which is recessed for reception of a percussion element 2, a firing pin 3, and a cap 4 which functions to confine the firing pin in the recess. As illustrated, the bottom of the recess is countersunk for reception of the percussion element 2, and this element is tightly fitted within the countersunk recess. The cap 4 is similarly press-fitted in the top of the recess, while the firing pin 3 is loosely confined within the sleeve so that it may be forcibly projected against the top of the percussion element 2 when occasion demands. It will be noted that the percussion element 2 has a rounded top 5; that the firing pin 3 has a teat 6 on the under side thereof, which teat normally engages the curved top of the percussion element 2; and that the cap 4 takes the form of a sleeve having an inturned flange 7 at the outer end, this end, as indicated at 8 in Fig. 1, being in assembly slightly inset below the end surface 9 of the body member 1 of the head.

Referring now to Figs. 3, 4 and 5, the machine in the illustrated embodiment comprises a rotary worktable 11 which constitutes a carriage for the casings 1 of the priming head and which carries the said casings successively into the predetermined positions where the assembling operations take place. The intermittent rotation and indexing of the worktable 11 is accomplished in the present instance by a reciprocatory member 12 which carries a pawl 13 for engagement with pins 14 arranged in annular series on the table, as shown in Fig. 5. Each reciprocatory movement of the member 12 moves the table, through the medium of the pawl 13 and pins 14, into a properly indexed position for one of the assembling operations.

The machine also comprises a plurality of endless conveyer belts 15, 16 and 17 which are arranged to carry the elements 2, 3 and 4 into positions opposite the worktable for transfer to the casings 1 in the assembling operation, the transfer mechanism being hereinafter described. In conjunction with the transfer mechanism, the machine comprises a vertically reciprocatory head 18 which carries plungers 19 and 21 which operate to force the elements 2, 3 and 4 into their several positions within the casing 1. Reciprocation of the member 18 is obtained through cranks 22 on a shaft 23, this shaft being connected through a pulley 24 with a suitable source of power. This shaft is also connected through gears 25 and 26 with a shaft 27, and through this shaft and associated bevel gears 28 and 29 with a cam shaft 31, from which the aforesaid transfer mechanism is actuated, as hereinafter more fully set forth. The shaft 31 is also connected through suitable sprockets and a chain 32 with a reduction gear 33, and through this gear with the shafts 34 and 35 which carry the pulleys 36, 37 and 38 on which the belts 15, 16 and 17 travel.

The belt 15, which travels in the direction indicated by the arrows in Fig. 7, carries the percussion elements 2, these elements being deposited upon the belt with their rounded top surfaces 5 downwards. The elements are carried by the belt between guides 39 and 41 which maintain them in a single row, as illustrated in Fig. 7. The guideway 42 between the guides 39 and 41 terminates in a cross channel 43. The rear end of this channel is occupied by a reciprocatory plunger 44, and the front end of the channel terminates in an enlarged portion 45, see Fig. 7, which is adapted for reception of a transfer member 46. The member 46 has in its outer end a recess 47 between two resilient arm portions or bifurcations 48, 48. The recess 47 is arranged so that when the end of the member 46 occupies the recess 45, see Fig. 14, the said recess 47 is in alignment with and lies in immediate proximity to the end of the channel 43. As the plunger 44 moves forward, that one of the percussion elements 2 which lies within the channel 43 is forced by the plunger into the socket 47, where it is retained by the resilient pressure of the arms 48, 48.

The plunger 44 is slidably mounted in a block 49, which block in turn is slidably guided in a suitable support 51, see Fig. 7. The block 49 is operatively connected through a roller 52 with a cam 53 on the shaft 31 whereby rotation of the said shaft results in a reciprocating movement of the said plunger. Preferably and as illustrated, the plunger 44 is normally held by pressure of a spring 54 in an advanced position in the block 49 whereby if the plunger 44 meets an obstruction during the advance movement of the block 49, the plunger may be retracted against the spring 54 without breakage of any of the immediately associated parts of the machine.

The transfer member 46 is supported in a block 55 which is carried at one end of a rock shaft 56, this shaft being journaled in the present instance between the points 57, 57 on the fixed framework of the machine. The shaft 56 is threaded for reception of a collar 58, and between this collar and the adjoining side of the block 55 a toothed pinion 59 is confined so as to be fixed to the shaft. The pinion 59 meshes with a gear 61 which is suitably journaled in the frame of the machine and which has attached thereto a second gear element 62. This element meshes with a toothed rack 63 which is slidably supported in a suitable guide 64 on the frame and which has at its rear end a roller 65 which is in operative engagement with the cam 53 on the shaft 31. Rotation of the shaft thereby effects a longitudinal reciprocation of the rack 63 and an oscillation of the shaft 56 which carries the transfer member 46. The transfer member is carried by this oscillation through an angle of approximately 180° whereby the outer terminal end of the member passes from the position within the recess 45, as previously described, to a position as shown in Fig. 7, wherein the socket 47 overlies and is in direct alignment with the open top of the casing 1 of one of the priming heads on the table 11. These two extreme positions of the transfer member are controlled by adjustable stops 66, 66 on the frame which are positioned for engagement with one side of the block 55, as shown in Fig. 8. It will be noted that the bifurcations 48, 48 are provided with arcuate flanges 67, 67 which, in effect, form extensions of the walls of the socket 47. When the member 46 is in the position overlying one of the priming head casings, the flanges 67 project downwardly into the open top of the casing and into proximity to the inner countersunk recess in which the percussion element 2 is to be established. The flanges are then in position to act as guides for the percussion element 2 as the latter is forced from the transfer member into the countersunk recess in the head 1 which is adapted for its reception. It will be noted that in its movement with the transfer member, the percussion element 2 has been brought into an upright position with the rounded top uppermost, and it is in this position that the element is pressed into the casing 1.

When the transfer member 46 is in the position overlying one of the priming head casings on the table 11 as described above, the socket 47 is also in alignment with the plunger 19 on the reciprocatory head 18, the positional relationship of the parts being illustrated in Figs. 6 and 8. In the normal operation of the machine, the member 18 now moves downwardly so that the plunger 19 entering the top of the socket 47 displaces the percussion element 2 downwardly, see Fig. 13, into the countersunk recess which is provided for its reception in the priming head casing 1. The manner in which the flanges 67 function to guide the percussion element 2 into the said countersunk recess is clearly illustrated in Fig. 13.

It will be understood that the table 11 is intermittently actuated through the medium of the member 13, as previously set forth, to bring the priming head casings 1 which are supported in recesses 68 in the peripheral portion of the table, as shown in Fig. 13, successively into positions in alignment with the transfer member 46 and the plunger 19, the table being accurately indexed so as to insure true alignment of the parts. As previously set forth, the movement of the table is effected through the pawl 13 acting on the pins 14 and actuated by the reciprocatory member 12. The member 12, as shown in Fig. 3, is operatively connected through a pivoted lever 69 with a crank 71 on the shaft 23, so that the intermittent movement of the table 11 is accurately synchronized with the movements of the transfer member 46, the reciprocatory movement of the plunger 44, and the reciprocatory movement of the member 18 which carries the plunger 19. In other words, the movements of all the various parts of the mechanism originate from the shaft 23.

In order to afford clearance for the swinging movement of the transfer member 46, the plunger 19 is given a longer movement than the throw of the supporting member 18. To this end, the plunger 19 is supported slidably within a sleeve 72, said plunger being normally held in the lower end of the sleeve by a spring 73. This spring is sufficiently strong to resist any normal pressure imposed upon the plunger 19, but will contract under abnormal pressure to prevent breakage of the parts. The sleeve 72 is slidably supported in a suitable guide in the member 18, and has thereon a rack 74 which meshes with a gear or pinion 75 journaled on the member 18. This gear 75 also meshes with a rack 76 supported on the fixed frame of the machine. With this arrangement, movement of the member 18 in either direction is accompanied by a greater movement of the plunger 19.

After insertion of the percussion element 2 at station A, see Fig. 7, as described above, the partially assembled priming head is advanced by the intermittent movement of the table 11 to the station indicated at B, wherein the other parts of the priming head, namely, the firing pin 3 and retaining cap 4, are inserted in the casing 1. The firing pins 3 are fed into the machine on the belt 16, and the caps 4 on the belt 17. The relative positions of these belts are best shown in Figs. 9, 10, and 16 to 18, inclusive. The pins 2 and caps 3 are carried by the belts through channels 77 and 78 whereby the said pins and caps are held in a single line. The channel 77 dead ends in a cross channel 79, within which is a plunger 81 similar to the plunger 44 previously described. The channel 78 also terminates in a cross channel 82 which directly overlies the cross channel 79, see Figs. 17 and 18, and a second plunger 83 is slidably mounted in the channel 82. When advanced, the plungers 81 and 83 are adapted to move one each of the pins 3 and caps 4 into the ends of the respective channels 79 and 82, as shown in Fig. 20, in which positions the pins 3 directly underlie the open under side of the cap 4. At this point also, the bottom wall 84 of the channel 82 is provided with an opening sufficiently large to permit passage therethrough of the pin 3, said opening being in exact alignment with the cap 4 when the latter occupies the terminal end of the passage 82, as illustrated. The bottom wall 85 of the passage 79 is also provided at its terminal end with an opening of a size to accommodate a vertically reciprocatory plunger 86. This plunger, shown in Fig. 20, normally forms a part of the bottom wall 85 of the passage 79 and closes the said opening, but after the plunger 81 has advanced one of the pins 3 into the end of the passage 79, the plunger 86 is actuated, as hereinafter described, to elevate the pin 3 through the opening in the lower wall 84 of the passage 82 into the interior of the overlying cap 4. Continued upward movement of the plunger 86 carries the pin and cap assembly upwardly into a recess 87 in the under side of a transfer member 88, see Fig. 21, and in this position, the pin and cap assembly is retained in the recess 87 by suction, as hereinafter described, so that when the plunger 86 is retracted, the pin and cap assembly will remain in the recess 87.

With reference to Fig. 17, it will be noted that the pins 3 are carried on the belt 16 in position wherein the tests 6 are at the under side so that the pins are supported on the belt in a slightly inclined position. As the pins 3 are advanced on the belt 16 towards the channel 79, they are carried under a cover plate 89, the surface of which slants downwardly toward the channel 79, as shown in Fig. 17. This inclined surface of the cover plate 89 by engagement with the tops of the pins 3 gradually adjusts the pins into a truly horizontal position wherein they rest solely upon the teats 6. This final position of the pins 3 is clearly shown in Figs. 16 and 17. As the pins are advanced in the channel 79 by the action of the plunger 81, see Fig. 16, the teat 6 moves into a slot 91 provided for its reception in the bottom wall of the channel 79, and the slot 91 is also extended into the upper end of the plunger 86 so that the pin 3 may occupy a normally horizontal position on the top of the said plunger. Thus supported, the pin 3 is in position to be carried upwardly on the plunger 86 into the cap 4.

The plungers 81 and 83 are carried in a slide 92, which slide is guided for rectilinear sliding movement in the casing, as indicated in Fig. 9. The rearward extension of the slide 92 carries a roller 93 which engages a cam 94 on the shaft 31. The plungers 81 and 83 are slidably mounted in the slide 92, see Figs. 9 and 10, and each is held in an advanced position in the slide by a spring 95, and also by a spring 96 which is confined between an arm 97 depending from the slide 92 and a collar 98 on a rod 99 secured to the plunger and extending freely through the said arm 97. The springs 95 and 96 are sufficient to hold the plungers 81 and 83 in the advanced position in the slide 92 against any normal pressure, but an abnormal pressure will cause the plungers to retract the springs to thereby prevent breakage of the parts of the machine.

The plunger 86 is slotted at 101, see Figs. 9 and 16, for reception of an arm 102 on a rock shaft 103, said shaft being journaled in the frame of the machine, as best shown in Figs. 7 and 9. To the rear end of the shaft is attached an arm 104 carrying a roller 105 which engages a cam 106 on the shaft 31. Rotation of the shaft and of the cam causes an oscillation of the rock shaft 103 and a consequent vertical reciprocation of the plunger 86. A spring 107 holds the cam roller 105 in engagement with the cam.

The transfer member 88, as best shown in Figs. 6, 7 and 9, is carried on a slide 108, this slide being supported in a guide 109 for longitudinal reciprocation. The rear end of the slide 108 carries a roller 111 which engages in a groove in the cam 94 on the shaft 31. Action of the cam causes the transfer member 88 to move in a rectilinear path between two positions, one overlying the terminal ends of the channels 79 and 82 and the plunger 86, all as previously described and illustrated in Figs. 16, 20 and 21, and the other overlying the path of the priming head casings 1 as they advance on the rotating table 11. This latter position of the transfer member 88 is designated by the reference character B on Fig. 7, and is illustrated in greater detail in Figs. 9 and 22.

The structural form of the member 88 is best shown in Fig. 16. It comprises an outer casing 112 having an opening 113 in the bottom, and having slidably supported in the interior thereof a plunger 114. This plunger is confined at the top by a gland 115 through which the projecting upper end 116 of the plunger extends above the top of the casing 112. The lower end of the plunger is splined, as best shown in Fig. 19, wherein the splines are designated by the reference numeral 117. These splines are fitted in correspondingly formed grooves 118 in the walls of the opening 113 of the casing 112 so that while the plunger 114 is slidable longitudinally in the casing 112, it is held by the splines against rotational movement. It will be noted that the outer terminal ends of the splines are inset slightly from the extreme surface 119 of the plunger, this arrangement having the function hereinafter described. A spring 121 normally retains the plunger 114 in an elevated or retracted position, as shown in Fig. 16.

The plunger 114 is provided with a central longitudinal bore 122 extending upwardly from the end surface 119, and this bore communicates through a transverse port 123 with a tube 124. This tube extends through a slot 125 in the casing 112, see Fig. 6. To the outer end of the tube is attached a flexible tube 126 which extends to a suitable source of suction. As shown in Figs. 16 and 20, the terminal surface 119 of the plunger 114 forms the upper movable wall of the recess 87 which receives the firing pin and cap assembly, as previously described and as illustrated in Fig.

21. When the plunger 86 has thus carried the pin and cap into the recess 87, the suction imposed as described above upon the bore 122 acts to retain the assembly in the recess, it being apparent that the suction acts immediately upon the firing pin 3 and retains the cap 4 through the engagement of the pin 3 with the inturned flange 8.

In operation and following the elevation of the sub-assembly consisting of the firing pin 3 and cap 4 into the recess 87 of the transfer member 88, the latter is shifted by action of the cam 93 to the position indicated in broken lines in Fig. 16, in which as previously set forth the transfer member directly overlies one of the priming head casings supported in the table 11, in which casing the percussion element 2 has previously been inserted, as shown in Fig. 16. In this position, the plunger 114 directly underlies the plunger 21 on the carrier 18, see Fig. 6, it being noted that this latter plunger is slidably supported in the member 18 and is backed by a relief spring 127, which functions after the manner of the spring 73 previously described. Downward movement of the member 18 and with it of the plunger 21 causes the latter to engage the projecting end 116 of the plunger 114, and forces the latter downwardly in the casing, thereby displacing the pin and cap assembly from the recess 87 and forcing it into the open upper end of the priming head casing 1, as shown in Fig. 22, to thereby complete the assembly. The ends of the splines 117, see Fig. 22, which as previously stated are set slightly back of the terminal surface 119 of the plunger engages the top surface of the casing 1, whereas the body of the plunger extends slightly below the top surface of the casing 1, so that in the final assembly and as shown in Figs. 1 and 22, there is a slight clearance between the top surface of the casing and the outer terminal surface of the cap 4.

The assembly operation now being complete, the finished priming heads are removed from the table 11 and replaced by empty casings 1 for a continuation of the assembly process.

The structural form and mode of operation of the machine will be clear from the foregoing description.

I claim:

1. In a machine for assembling the percussion elements, firing pins, and caps in the casings of priming heads, said machine comprising a travelling support for said casings and means for indexing said support so as to move each of said casings successively into two predetermined positions, a transfer mechanism for carrying a percussion element to each of the casings as the latter occupy one of said positions and for inserting said element in the casing, means for conveying the elements to the transfer mechanism, a conveyer for each of the firing pins and caps, mechanism operatively associated with said conveyers for inserting the pins in the caps as sub-assemblies, and transfer mechanism for carrying said sub-assemblies to the respective casing when the latter occupy the second of said positions and for inserting the sub-assembly as a unit in the casing above the percussion element.

2. In mechanism for inserting percussion elements in the casings of priming heads, said mechanism comprising a support for said head, a combined transfer member and guide pivotally movable in a vertical plane through an angle of approximately 180° to a position overlying said casing, said member comprising a retainer for a percussion element having an extension adapted to project into the cavity of said casing as a guide for said percussion elements, mechanism operative when the transfer member is at the other end of its travel for introducing a percussion element into the said retainer, and mechanism operative when the said member overlies the casing for displacing the percussion element from the retainer by way of said extension into the casing.

3. In an assembling machine, a work support, a pair of relatively spaced plungers movable each in a relatively fixed path to and from said support, said support being movable so as to advance a work piece carried thereby progressively into positions in alignment with said plungers, a plurality of conveyers, a transfer member movable in a path traversing the space between one of said conveyers and the work support for transferring a work element from the conveyer to a position in the path of movement of one of said plungers and between the plunger and said work piece, means for conjoining work elements from two others of said conveyers for transfer simultaneously to a position in the line of movement of the other of said plungers and between that plunger and the work piece, transfer means for the last-named elements, and mechanism for synchronous actuation of said support, the plungers and the transfer members.

4. In an assembling machine, the combination with a work support, of a plunger movable in a relatively fixed path to and from said support, said support being movable so as to advance work pieces carried thereby successively into position in alignment with the plunger, a pair of conveyers operating in different vertical planes, a vertically movable plunger positioned in proximity to said conveyers, means for transferring a work element from each of said conveyers transversely to a position overlying said plunger and superimposed one above the other, a transfer member movable between one position overlying said last-named plunger and another position in the path of the first-named plunger and between the latter plunger and a work piece carried by said support, means in said transfer member for receiving and retaining said work elements, means for actuating the second-named plunger to elevate the work elements into the transfer member, and means for synchronously actuating said plungers, the transfer means and the support.

5. In an assembling machine, a pair of conveyers operating in different horizontal planes, means operatively associated with said conveyers for displacing work elements carried by the latter into a vertically aligned position adjoining said conveyers, a vertically movable plunger underlying said position and providing a support for the lower of said elements, a transfer member overlying said position and having means for receiving and retaining said elements, mechanism synchronized with said element-displacing means for actuating the plunger to elevate the said elements together into the receiving and retaining means of said transfer member, and mechanism operating in synchronism with the plunger for actuating said transfer member.

6. In an assembling machine, the combination with a pair of conveyers movable in different horizontal planes, a vertically movable plunger positioned adjacent said conveyers, a transfer member movable to and from a position overlying and in alignment with said plunger and above said conveyers, a recess in the bottom of said transfer member, suction means connected with said recess, means for displacing work elements from the conveyers to a vertically aligned position overlying said plunger, and means for actuating said plunger to elevate said elements jointly into the recess of said transfer member, said suction means being operative to retain said elements in the recess.

7. In an assembling machine, the combination with a conveyer, of a vertically movable plunger positioned adjacent said conveyer, means for displacing a work element from the conveyer to a position overlying said plunger, a transfer member movable between one position in alignment with and overlying said plunger and a second relatively remote position, said transfer member comprising a casing having a recess in the bottom thereof for alignment with said plunger, a plunger mounted in said casing and movable downwardly through said recess, resilient means for normally retaining said plunger in an elevated position in the casing, a passage extending through said plunger to the bottom terminal end thereof and opening into said casing recess, means for actuating the first-named plunger to elevate the work element into the recess in the bottom of said casing and against the lower terminal end of said casing plunger, suction means connected with said passage and acting to retain the said work element in the said recess, mechanism for synchronously actuating said transfer member and the elevating plunger, and means operative in the second-named position of said transfer member for depressing the plunger in the casing to expel the work element from the latter.

8. In an assembling machine, a work support, a plunger movable in a relatively fixed path to and from the said support, said support being movable so as to advance recessed work pieces carried thereby successively into position in alignment with said plunger, a transfer member movable to and from a position overlying and in alignment with the recess in said work piece and in the path of movement of said plunger, a recess in the bottom of said transfer member, a normally retracted plunger movably supported in said transfer member and forming the bottom wall of said recess, means for introducing a work element into said recess, suction means in said transfer member for retaining the element in the recess, and means for actuating the plunger first named to depress the plunger of the transfer member to thereby force the work element from the last-named recess and into said work piece.

9. In an assembling machine, a work support, a plunger movable in a relatively fixed path to and from the said support, said support being movable so as to advance recessed work pieces carried thereby successively into position in alignment with said plunger, a transfer member movable to and from a position overlying and in alignment with the recess in said work piece and in the path of movement of said plunger, a recess in the bottom of said transfer member, a normally retracted plunger movably supported in said transfer member and forming the bottom wall of said recess, means for introducing a work element into said recess, suction means in said transfer member for retaining the element in the recess, and means for actuating the plunger first named to depress the plunger of the transfer member to thereby force the work element from the last-named recess and into said work piece, the said plunger of the transfer member having splines engageable with the terminal end surface of said work piece and set back from the terminal end of the plunger whereby said splines may limit the extent to which the said plunger enters the recess in said work piece.

10. In an assembling machine, an intermittently movable work support, a vertically reciprocatory member, a plunger vertically movable in said reciprocatory member and overlying the support, a transfer member oscillatable in a vertical plane to and from a position in alignment with said plunger and between said plunger and the work support, mechanism for vertically reciprocating the plunger-carrying member, a rack on said plunger, a relatively fixed rack in proximity thereto, and a pinion journaled on said vertically reciprocatory member and meshing with said racks.

11. In an assembling machine, a conveyer, a vertically reciprocatory plunger adjacent said conveyer, support means bridging the space between the conveyer and said plunger, means for displacing a work element from the conveyer and over said support means to a position on the plunger, said support means having a recess for reception of a projection on the bottom of said work element, and said plunger having at its upper end a corresponding recess in alignment with the recess in said support, a transfer member movable to and from a position overlying said plunger, and mechanism for elevating the plunger to carry the said work element to the transfer member.

12. In a machine for assembling the percussion elements, firing pins and caps in the casings of priming heads, said machine comprising a support for said casings, a plurality of transfer mechanisms operatively associated with the support, means for actuating the support to bring the casings successively into operative positions with respect to said transfer mechanisms, means for feeding the percussion elements to one of the said mechanisms at a point remote to the said support for transfer individually to the respective casings, means remote to said support for assembling the firing pins in the caps in mated pairs and for feeding said pairs to the other of said mechanisms for transfer as units to the respective casings, and means for synchronized actuation of the support and the said transfer and feeding means.

13. In a machine for assembling the firing pins and caps in the casings of priming heads, said machine comprising a support for said casings, a transfer mechanism, and means for intermittently actuating the support to bring the casings successively into operative position with respect to the transfer mechanism, means remote to said support for loosely assembling the said pins and caps in mated pairs and for feeding each of the pairs as a unit to the transfer mechanism, means for actuating the said mechanism in synchronism with the movements of the support and with said feeding means to transfer the said units to the respective casings, and suction means in said transfer mechanism for retaining the loosely assembled units in the mechanism during transit to the casings.

HOWARD THOMAS HALLOWELL, Jr.